United States Patent [19]

Sheridan et al.

[11] Patent Number: 4,644,373

[45] Date of Patent: Feb. 17, 1987

[54] FLUID ASSISTED ION PROJECTION PRINTING HEAD

[75] Inventors: Nicholas K. Sheridan, Saratoga; Gerhard K. Sander, Los Altos Hills, both of Calif.

[73] Assignee: Xerox Corporation, Stamford, Conn.

[21] Appl. No.: 806,876

[22] Filed: Dec. 9, 1985

[51] Int. Cl.⁴ .............................................. G01D 15/6

[52] U.S. Cl. ..................................... 346/159; 250/426

[58] Field of Search ................ 346/155, 154; 250/325, 250/326, 423 R, 426; 315/111.81; 369/230

[56] References Cited

U.S. PATENT DOCUMENTS 4,524,371 6/1985 Sheridon et al. .................... 346/159

4,538,163 8/1985 Sheridon et al. .................... 346/159

4,584,592 4/1986 Tuan et al. .......................... 346/159

*Primary Examiner*—Arthur G. Evans

*Attorney, Agent, or Firm*—Serge Abend

[57] ABSTRACT

An improved fluid assisted ion projection printing head comprising a one-piece body having design features therein, including a generally U-shaped cavity, to which is mated a generally featureless, planar, conductive member which forms a closure for the major portion of the cavity opening and defines an ion generation chamber and a cavity exit region therewith. At least the one wall of the cavity adjacent the exit region is electrically conductive. A conductive wire supported on the body, extends in the direction of the cavity and is located closer to the one wall and to the conductive member than to any of the other walls of the cavity.

6 Claims, 6 Drawing Figures

FLUID ASSISTED ION PROJECTION PRINTING HEAD

This invention relates to an improved low cost, easily manufactured, highly efficient, fluid assisted ion projection printing head. The head comprises a one-piece conductive body which can be easily cast and which mates with a substantially flat conductive plate.

BACKGROUND OF THE INVENTION

In two patents assigned to the same assignee as the instant application, there are disclosed different forms of a fluid jet assisted ion projection printing apparatus. In each of U.S. Pat. No. 4,463,363 entitled "Fluid Jet Assisted Ion Projection Printing" (Robert W. Gundlach and Richard L. Bergen) and U.S. Pat. No. 4,524,371 entitled "Modulation Structure for Fluid Jet Assisted Ion Projection Printing Apparatus" (Nicholas K. Sheridon and Michael A. Berkovitz), there is disclosed an ion generation chamber through which air is moved for entraining ions generated therein and for transporting them through an exit channel including an ion modulation region for subsequent deposition upon a latent image receptor. In U.S. Pat. No. 4,463,363, the entire exit channel, including the modulation region, forms a straight path extending from the ion generation chamber to the image receptor. In U.S. Pat. No. 4,524,371, the improvement over the U.S. Pat. No. 4,463,363 structure resides in the exit channel defining a bent path through which the ions flow, in order to allow the ion modulation control elements to be fabricated upon a planar substrate.

In both of these patents the ion generation chamber is formed as a substantially cylindrical cavity within which the corona wire is centrally located. It was believed that the cylindrical configuration was necessary in order to obtain a stable corona discharge from the corona wire. The high electrical fields established between the axially mounted corona wire, maintained at several thousands volts d.c., and the equidistant conductive walls of the cavity, were expected to cause arcing to any portion of the cavity walls which were non-smooth or to any corners therein where electrical lines of force would be concentrated.

However, it is extremely expensive to construct a head having the cylindrical cavity therein, since such a construction requires the head to be made up of two precisely mating parts. Since the two parts must be properly aligned and must accurately fit together, dimensional tolerances are critical. Furthermore, the correct inlet and outlet openings leading to and from the cavity had to be accurately controlled in order to avoid non-uniformities in corona current output. It appeared to be inevitable that the cost of the printing heads would be high because of these stringent manufacturing requirements.

Therefore, it is the primary object of the present invention to provide an improved fluid jet assisted ion projection printing head design which would be easily manufacturable at low cost.

Fortuitously it was discovered that a one-piece configuration, which is inherently easier and less expensive to manufacture, was also more efficient in its delivery of corona current. Thus, it is a further object of the present invention to modify the printing head structure by departing from the cylindrical cavity and by using a one-piece head.

SUMMARY OF THE INVENTION

The present invention may be carried out in one form by providing a fluid flow assisted ion projection printing head including a body defining an elongated cavity therein, within which a conductive wire is supported. The cavity encloses the wire on three sides and one of the sides comprises an electrically conductive wall. An opening in the body passes through one of the walls of the cavity for introducing a transport fluid. The major portion of the cavity opening is closed by a planar electrically conductive plate against which a second planar member, supporting electronic control elements, is held and is separated therefrom by an intermediate dielectric member. The wire is located closer to the conductive wall and the conductive plate than to any of the other walls of the cavity for concentrating the major portion of electrical field between the wire and these elements, as opposed to any other portions of the cavity walls, when the wire is connected to a source of electrical potential.

BRIEF DESCRIPTION OF THE DRAWINGS

Other objects and further features and advantages of this invention will be apparent from the following, more particular, description considered with the accompanying drawings, wherein.

DETAILED DESCRIPTION OF THE PREFERRED EMBODIMENT

Figure 1:
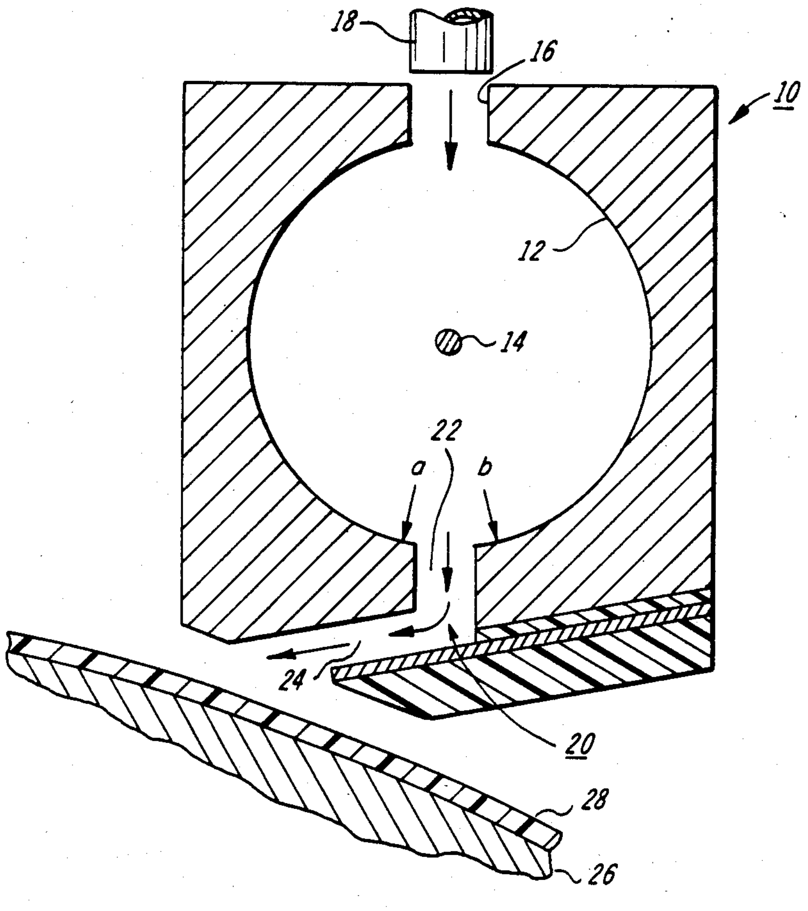
FIG. 1 (PRIOR ART)
FIG. 1 is a partial sectional elevation view showing the prior art fluid assisted ion projection printing head.
Figure 2:
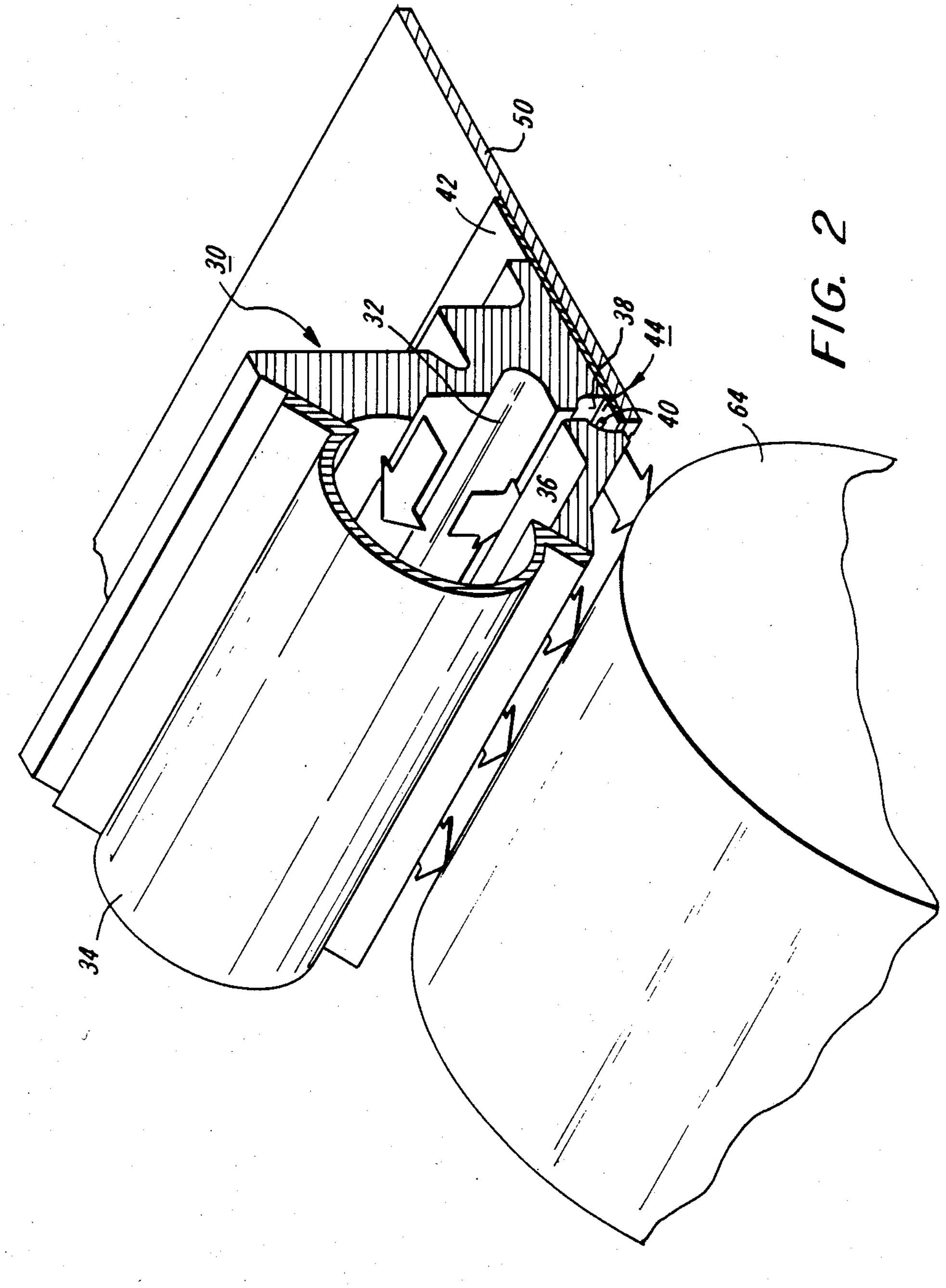
FIG. 2 is a perspective view showing the improved ion projection printing head of the present invention.
Figure 3:
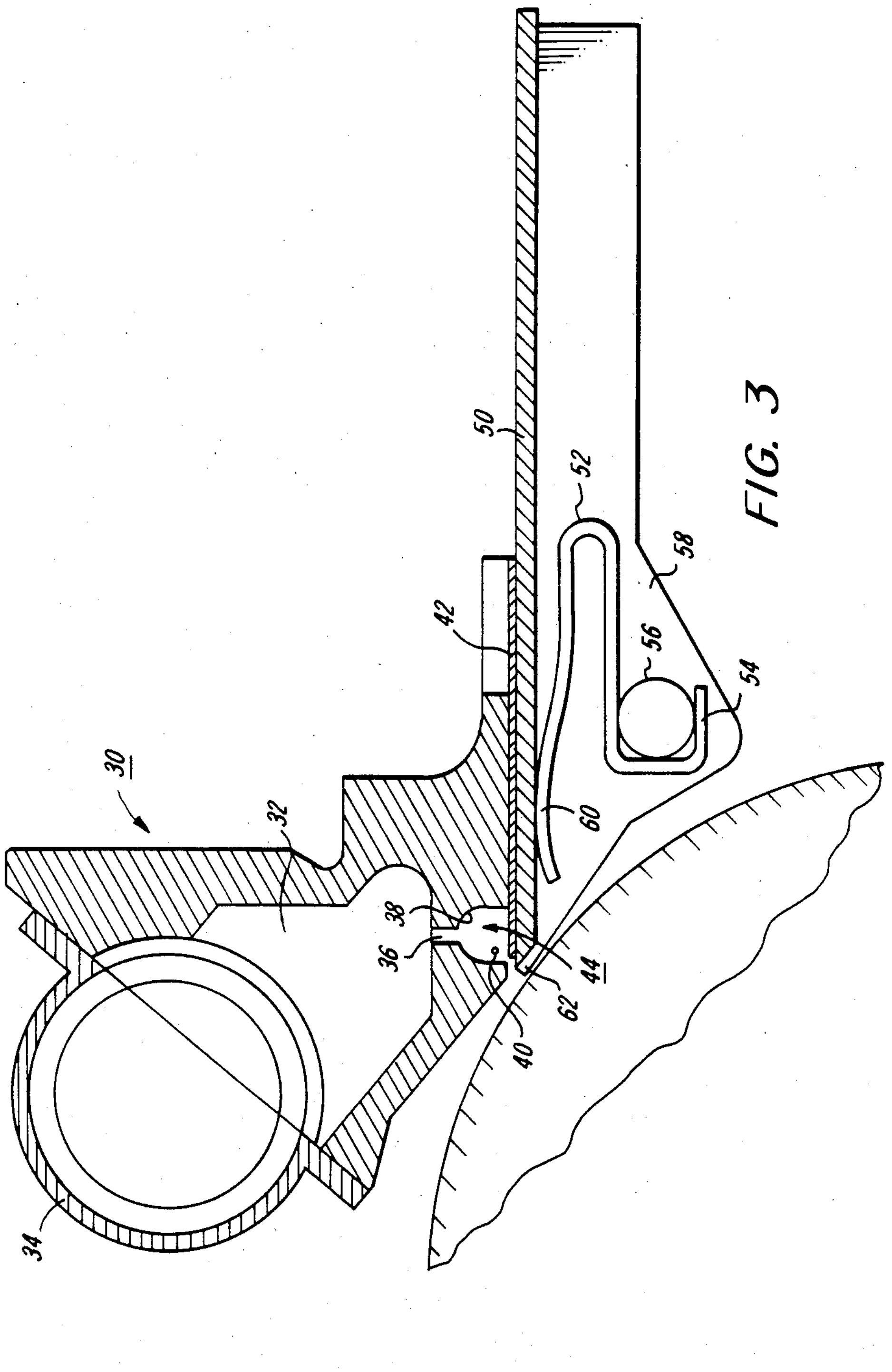
FIG. 3 is a sectional elevation view showing the improved head of the present invention.

With particular reference to the drawings, there is illustrated in FIG. 1 a fluid flow assisted ion projection printing head 10 of the form described in U.S. Pat. Nos. 4,463,363 and 4,524,371. Within the housing 10 is an ion generation region including an electrically conductive cylindrical cavity 12, a corona wire 14 extending substantially coaxially in the cavity to which a high potential source (not shown) is connected. A source of reference potential (also not shown) is connected to the housing. Fluid transport material, such as air, is delivered into the cavity 12 through an axially extending inlet channel 16, from a suitable source, schematically represented by tube 18. An axially extending exit channel 20 conducts the transport fluid and the ions entrained therein from the corona cavity 12 to the exterior of the printing head 10 via a bent path comprising a cavity exit region 22 and an ion modulation region 24.

The ions allowed to exit the printing head come under the influence of an electrically conductive acceleration electrode 26 which attracts them in order that they may be deposited upon the surface of dielectric layer 28 coated thereon. A high potential electrical source (not shown), on the order of several thousand d.c., of a sign opposite to that of the corona potential is connected to the acceleration electrode.

Typically, the diameter of the ion generation cavity 12 has been on the order of 125 mils (0.125 inch). Considering the FIG. 1 structure at that scale, it should be apparent that in order for cavity exit region 22 to be relatively short, so as to control the ions in the ion modulation region 24, the thickness of the housing walls adjacent the cavity exit channel, identified as areas "a" and "b" would be exceedingly thin, and thereby lead to severe manufacturabillity limitations. Further reduction of the cavity diameter will exacerbate this problem. Additionally, since the head 10 can only be practically made and assembled in two halves, it will be apparent that accurate alignment and spacing thereof, in order to create a symmetrical cavity and the proper gap dimensions, for inlet and exit channels, will add substantially to manufacturing costs.

Our novel approach is based upon the desire to reduce manufacturing costs by designing a fluid assisted ion projection printing head made in one featured piece, to which a planar, featureless, cover plate may be simply attached. Surprisingly, the result of this design effort yielded a printer head with significantly higher output current, which brought with it other advantages.

Turning now to FIGS. 2 through 6 there is illustrated the printer head 30 comprising a casting of electrically conductive material. Presently, the head is cast of stainless steel but it should be understood that any conductive material will be satisfactory, as long as it will not be affected by extended exposure to the chemistry of the corona discharge. The upper portion of the printer head comprises a plenum chamber 32 to which is secured a fluid delivery casing 34. An entrance channel 36 receives the low pressure fluid (preferably air) from the plenum chamber and delivers it to the ion generation cavity 38. The entrance channel should have a large enough cross-sectional area to insure that the pressure drop therethrough will be small. Cavity 38 has a generally U-shaped cross-section, with its three sides surrounding a corona wire 40. Suitable wire mounting supports are provided at opposite ends of the housing for mounting the wire at a predetermined location within the cavity. By mounting the wire ends on eccentric supports, relative to the housing, some limited adjustment of the wire location is made possible. A planar conductive plate 42, typically 12 mils thick, closes the major portion of the U-shaped cavity, forming an ion generation chamber 44 and leaving a cavity exit region 46 between the end of the conductive plate and the adjacent cavity wall 48. It should be apparent that although a head of this construction is also formed of two parts, only one has features thereon and the other is featureless. Therefore, the cost of manufacturing, to enable assembly to tight tolerances, is greatly minimized.

A planar substrate 50, typically 40 mils thick, upon which the electronic control elements are supported, is held adjacent the conductive plate 42 by an elongated spring clip 52. The spring clip 52 extends substantially across the head and is held in place by a mounting end 54 secured upon a rod 56 which spans the head from end-to-end in side plates 58 (only one shown). A force applying end 60, of the spring clip, urges the planar substrate 50 and the conductive plate 42 against the head body. The spring clip 52 should exert sufficient force to flatten irregularities in both the substrate 50 and the conductive plate 42 in order to ensure a uniform ion current output from end-to-end across the head. We have found that a force of two pounds works satisfactorily. A pair of extensions on the side plates form wiping shoes 62 (only one shown) which ride upon the outboard edges of the image receptor 64 so that the proper spacing is established between the head and the image receptor.

When properly positioned on the head, by means of suitable locating lugs (not shown), the conductive plate 42 and the substrate 50 are each cantilever mounted so that they define, in conjunction with the head, an exit channel 66 including the cavity exit region 46 (about 10 mils long) and an ion modulation region 68 (about 20 mils long). Air flow through the head is generally represented by the arrows in FIG. 2 which illustrate the entry of air through the fluid delivery casing 34 and the plenum chamber 32, into the ion generation chamber 44 through entrance channel 36 and out of the ion generation chamber through exit channel 66.

Figure 4:
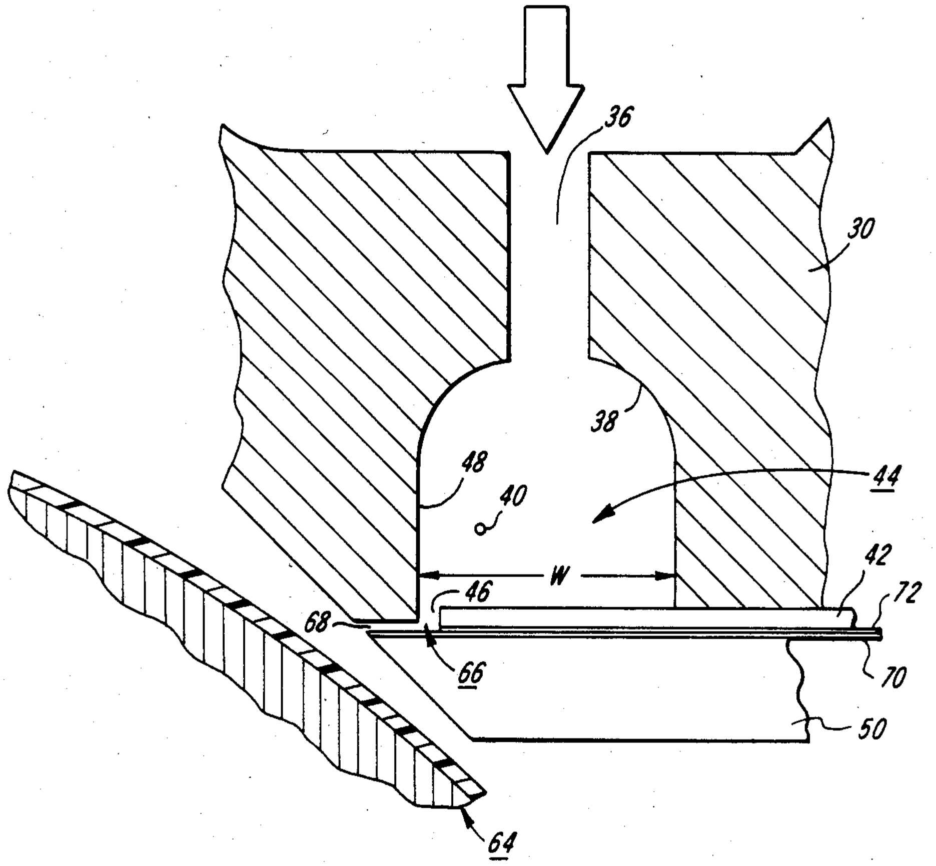
FIG. 4 is an enlarged sectional elevation view showing the ion generation cavity.

In FIG. 4 the features of the ion generation chamber 44 are most readily observable. In this enlarged view, it can be seen that two layers are interposed between the planar substrate 50 and the conductive plate 42. Preferably the substrate is a large area marking chip comprising a glass plate upon which are integrally fabricated thin film modulating electrodes, conductive traces and transistors. This large area chip is fully described in copending patent application U.S. Ser. No. 639,983 entitled "Marking Head For Fluid Jet Assisted Ion Projection Imaging Systems" (Hsing C. Tuan et al) assigned to the same assignee as the present invention. All the thin film elements are represented by layer 70. An insulating layer 72 overcoats the thin film layer to electrically isolate it from the conductive plate.

Figure 5:
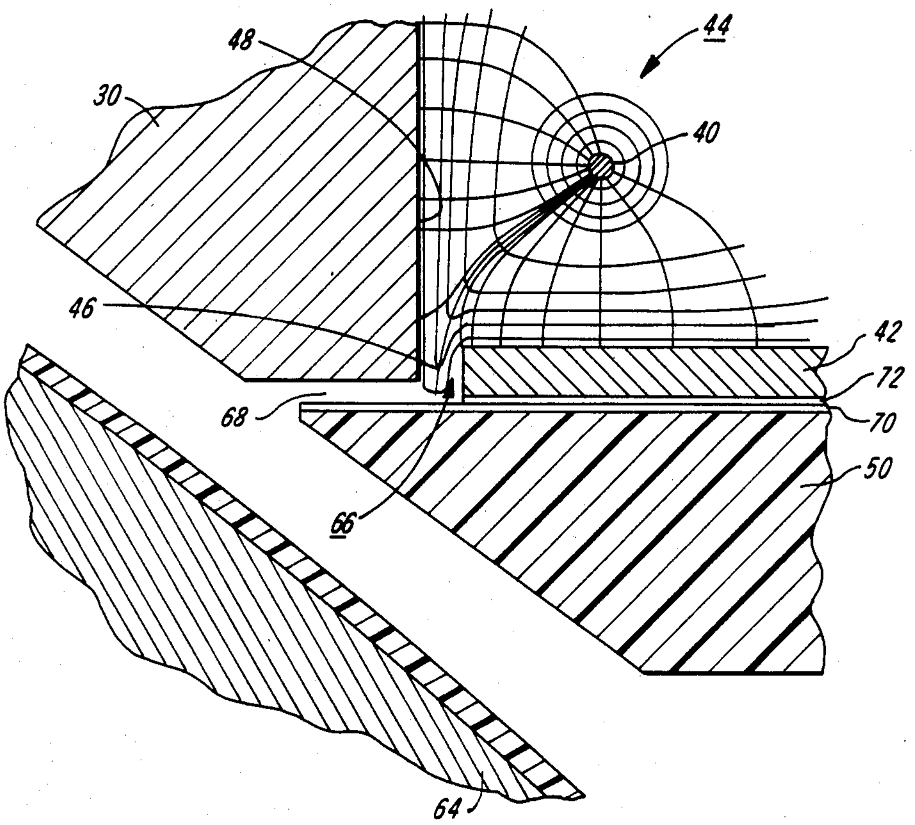
FIG. 5 is a further enlarged sectional elevation view showing the electrical lines of force in the corona generation area of the printing head.
Figure 6:
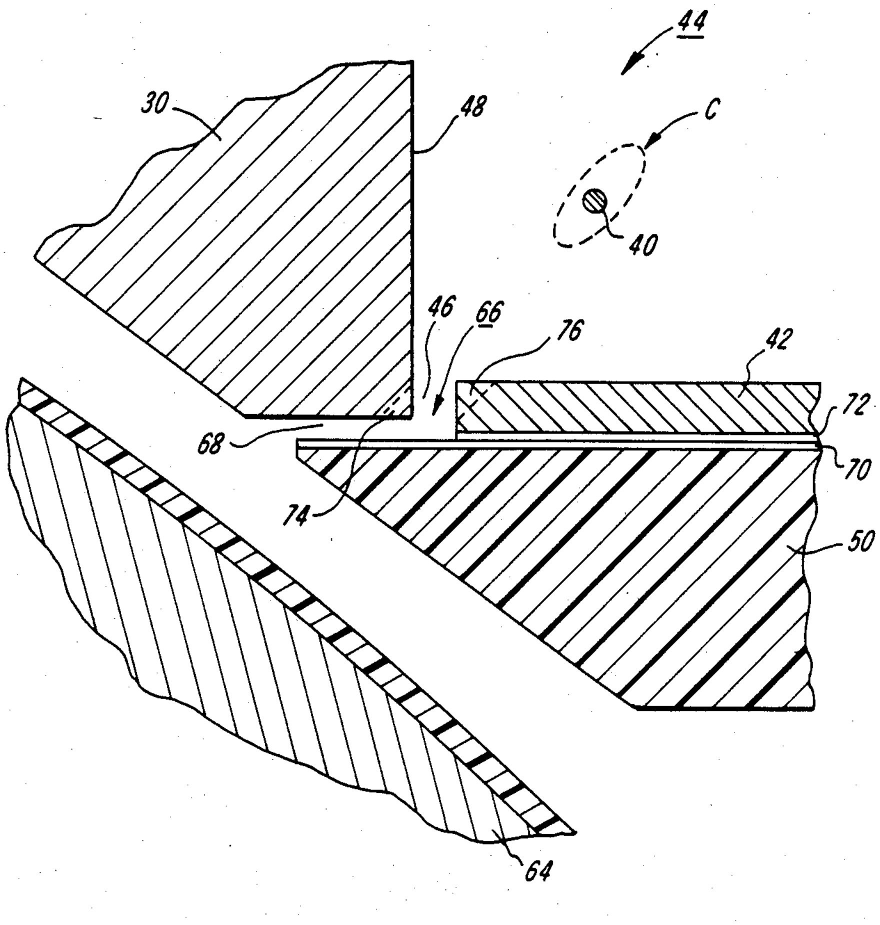
FIG. 6 is an enlarged sectional elevation view similar to that of FIG. 5, showing modifications in the corona generation area of the printing head.

In FIGS. 5 and 6, a further enlargement of a portion of the ion generation chamber 44 more clearly illustrates the corona generation area. Placement of the corona wire 40 is preferably about the same distance from the cavity wall 48 and from the conductive plate 42, and closer to these chamber walls than to the remaining cavity walls. We have found that such an orientation will yield higher corona output currents than heretofore made possible with a cylindrical ion generation chamber of comparable size. The width "w" across the cavity 38 is also about 125 mils but the wire 40 is spaced only about 25 mils from each of the conductive walls 48 and 42 (i.e., less than half the distance between the wire and the walls of the conventional cylindrical chamber). In FIG. 5 there is shown equipotential lines and electrical lines of force between the corona wire and these adjacent conductive walls. It can be seen that the great bulk of the ions will flow to the adjacent walls, although the cavity walls remote from the wire will attract some ions. However, it is only those ions following the lines of force into the cavity exit region 46, and those in close proximity, which will be driven out of the ion generation chamber 44. Therefore, it should be understood that it would be possible to fabricate the printer head of an insulating material, as long as the cavity wall 48 is made conductive and is suitably connected to a reference potential (such as ground). If the head is made insulating, the ion flow to the remote cavity walls will accumulate thereon. However, by spacing the wire much closer to the conductive walls than to the insulating walls, relatively few ions will flow to the insulating walls, charge build-up is minimized, and arcing to those walls is prevented.

Proposed modifications to the printing head are shown in dotted lines in FIG. 6. The corona wire 40 may be adjustably mounted for optimizing the ion current output within the zone of adjustment identified as area "c". Also, the exit channel 66 may be altered to improve the fluid flow characteristics. To this end, the corners 74 and 76 of cavity wall 48 and conductive plate 42, respectively may be broken off as indicated by the dotted lines. The sharp corners create sharp curves in the fluid flow path, which generate a substantial hydrodynamic loss. With the corners broken off, the hydrodynamic loss will be decreased and it would be possible to utilize a smaller, less expensive, air blower.

Our novel head configuration is more efficient than the prior cylindrical configuration, due primarily to the placement of the corona wire close to the chamber walls adjacent to the exit channel. Clearly, the improved efficiency allows the same parameters of operation to be employed with a resultant increase in ion output current. Alternatively, the higher efficiency has brought with it the ability to modify other printing head parameters, to the advantage of the printing process. Since the printing process, as we are presently practicing it, does not require the higher ion output current, it became possible to lower the output current to that previously obtainable with the cylindrical construction. By lowering the output current from our novel printing head, we were able to lower the air pressure requirement, enabling us to use a smaller, less expensive, quieter blower. The lower flow rate of the smaller blower will cause the ions to spend more time in the ion modulation zone, allowing a lower control voltage to be imposed upon the moduation electrodes. It has been demonstrated that the thin film amorphous silicon field effect transistors on the substrate have a longer life when operated at a lower voltage. Thus, the increased efficiency also increases the life of the large area control control chip.

It should be understood that the present disclosure has been made only by way of example, and that numerous changes in details of construction and the combination and arrangement of parts may be resorted to without departing from the true spirit and scope of the invention as hereinafter claimed.

What is claimed:

1. An improved fluid flow assisted ion projection printing head characterized by comprising a body defining an elongated cavity therein, a conductive wire supported on said body and extending in the direction of said elongated cavity, said wire being enclosed on three sides by the walls of said elongated cavity, a first one of said walls being electrically conductive, an entrance channel defined in said body, through one of said walls, for introducing a transport fluid into said cavity, a substantially planar, electrically conductive plate forming a closure for the major portion of the open side of said cavity, thereby forming a first portion of an exit channel between the end of said plate and said first one of said walls for providing a path for the removal of transport fluid from said cavity, a substantially planar member supporting electronic control elements, said planar member being held against said planar conductive plate and separated therefrom by an intermediate dielectric member, said planar member including a cantilevered portion spaced from said body for defining an extension of said exit channel, and wherein said wire is located closer to said first one of said walls and to said planar conductive plate than to any of the other walls of said cavity.

2. The improved fluid flow assisted ion projection printing head as defined in claim 1 characterized in that said body is made of one piece.

3. The improved fluid flow assisted ion projection printing head as defined in claim 1 or claim 2 characterized in that said body is made of a conductive material.

4. The improved fluid flow assisted ion projection printing head as defined in claim 1 characterized in that resilient means is provided for applying force to said planar member for urging said planar member and said conductive plate against said body and into a flattened condition.

5. The improved fluid flow assisted ion projection printing head as defined in claim 1 characterized by comprising adjustable mounting means for the ends of said conductive wire for allowing said wire to be repositioned relative to said first one of said walls and said planar conductive plate.

6. The improved fluid flow assisted ion projection printing head as defined in claim 1 characterized by including spacer means on said body for establishing the distance of the printing head from a receptor surface.

* * * * *